(12) United States Patent
Marvit et al.

(10) Patent No.: US 8,171,029 B2
(45) Date of Patent: May 1, 2012

(54) AUTOMATIC GENERATION OF ONTOLOGIES USING WORD AFFINITIES

(75) Inventors: David L. Marvit, San Francisco, CA (US); Jawahar Jain, Los Altos, CA (US); Stergios Stergiou, Sunnyvale, CA (US); Yannis Labrou, Washington, DC (US)

(73) Assignee: Fujitsu Limited, Kawasaki (JP)

( * ) Notice: Subject to any disclaimer, the term of this patent is extended or adjusted under 35 U.S.C. 154(b) by 812 days.

(21) Appl. No.: 12/242,950

(22) Filed: Oct. 1, 2008

(65) Prior Publication Data

US 2009/0094262 A1    Apr. 9, 2009

Related U.S. Application Data

(60) Provisional application No. 60/977,770, filed on Oct. 5, 2007.

(51) Int. Cl.
*G06F 17/30* (2006.01)

(52) U.S. Cl. . 707/740; 707/711; 707/736; 707/E17.086; 707/E17.099; 704/1; 706/12; 706/14; 706/45

(58) Field of Classification Search .................. None
See application file for complete search history.

(56) References Cited

U.S. PATENT DOCUMENTS

| | | | |
|---|---|---|---|
| 6,587,848 B1 | 7/2003 | Aggarwal et al. | 707/3 |
| 6,651,096 B1 | 11/2003 | Gai et al. | 709/223 |
| 6,847,966 B1 | 1/2005 | Sommer et al. | 707/5 |
| 6,996,572 B1 | 2/2006 | Chakrabarti et al. | 707/102 |
| 7,149,748 B1 * | 12/2006 | Stephan | 707/742 |
| 7,225,183 B2 * | 5/2007 | Gardner | 1/1 |
| 7,231,379 B2 * | 6/2007 | Parikh et al. | 1/1 |
| 7,266,548 B2 * | 9/2007 | Weare | 1/1 |
| 7,512,575 B2 * | 3/2009 | Mahesh | 706/45 |
| 8,041,702 B2 * | 10/2011 | Eggebraaten et al. | 707/708 |
| 2002/0174119 A1 | 11/2002 | Kummamuru et al. | 707/6 |
| 2003/0167163 A1 | 9/2003 | Glover et al. | 704/9 |
| 2003/0177112 A1 * | 9/2003 | Gardner | 707/3 |

(Continued)

FOREIGN PATENT DOCUMENTS

WO    WO 2005/091825 A2    10/2005

(Continued)

OTHER PUBLICATIONS

Wang et al, "Using Term Clustering and Supervised Term Affinity Construction to Boost Text Classification", Springer-Verlag Berlin Heidelberg, 2005.*

(Continued)

*Primary Examiner* — Hung Le
(74) *Attorney, Agent, or Firm* — Baker Botts L.L.P.

(57) ABSTRACT

In one embodiment, generating an ontology includes accessing an inverted index that comprises inverted index lists for words of a language. An inverted index list corresponding to a word indicates pages that include the word. A word pair comprises a first word and a second word. A first inverted index list and a second inverted index list are searched, where the first inverted index list corresponds to the first word and the second inverted index list corresponds to the second word. An affinity between the first word and the second word is calculated according to the first inverted index list and the second inverted index list. The affinity describes a quantitative relationship between the first word and the second word. The affinity is recorded in an affinity matrix, and the affinity matrix is reported.

21 Claims, 4 Drawing Sheets

110

| | $w_1$ DOG | $w_2$ FOREST | $w_3$ TREE | $w_4$ GRAPHICS | $w_5$ COMPUTER |
|---|---|---|---|---|---|
| | | | | | |
| $w_0$ BINARY | 0.003 | 0.005 | 0.037 | 0.021 | 0.066 |
| $w_1$ DOG | | 0.024 | 0.033 | 0.017 | 0.049 |
| $w_2$ FOREST | | | 0.092 | 0.004 | 0.052 |
| $w_3$ TREE | | | | 0.042 | 0.056 |
| $w_4$ GRAPHICS | | | | | 0.222 |

U.S. PATENT DOCUMENTS

| | | | |
|---|---|---|---|
| 2006/0212294 A1* | 9/2006 | Gorin et al. | 704/245 |
| 2007/0112714 A1* | 5/2007 | Fairweather | 706/46 |
| 2007/0150465 A1* | 6/2007 | Brave et al. | 707/5 |
| 2007/0150466 A1* | 6/2007 | Brave et al. | 707/5 |
| 2009/0094262 A1 | 4/2009 | Marvit et al. | 707/100 |

FOREIGN PATENT DOCUMENTS

| | | |
|---|---|---|
| WO | WO 2006/125271 A1 | 11/2006 |

OTHER PUBLICATIONS

The State Intellectual Property Office of China, First Notification of Office Action, Patent Application No. 200810166177.3, Chinese Office Action and English translation, forwarded by foreign associate to Baker Botts on Jan. 14, 2011, 9 pages, reported Jan. 14, 2011.

Brace, Karl S., et al., "*Efficient Implementation of a BDD Package*", Proceedings of the 27th ACM/IEEE Design Automation Conference, Paper 3.1, © 1990 IEEE, pp. 40-45, Jun. 24, 1990.

Communication from the European Patent Office, European Search Report for European Patent Application No. 08165760.3-1527, 7 pages, Jan. 26, 2009.

U.S. Appl. No. 12/242,965, by inventors David L. Marvit et al., entitled "Automatic Generating a Heirarchy of Terms,", 46 pages, filed Oct. 1, 2008.

U.S. Appl. No. 12/658,531, "Efficient Computation of Ontology Affinity Matrices," inventor Stergios Stergiou et al. 30 pages + 4 pages of drawings, filed Feb. 10, 2010.

The State Intellectual Property Office of China, First Notification of Office Action, Patent Application No. 200810165999.X, Chinese Office Action and English translation, 13 pages, May 27, 2010.

Gonzalo Navarro, Modern Information Retrieval, Chapter 8: *Indexing and Searching*, ACM Press, New York, XP 002457291, ISBN 9780201398298, pp. 191-228, Jan. 1, 1999.

Raymie Stata, et al., "*The Term Vector Database: fast access to indexing terms for Web pages*", Computer Networks 33, Elsevier Science Publishers B.V., pp. 248-255, Jun. 1, 2000.

European Patent Office, Communication, European Search Report Application No. 10153368.5-2201, Ref. P113501/EP00/FWW, 6 pages, Jun. 15, 2010.

Raymie Stata, et al., "*The Term Vector Database: fast access to indexing terms for Web pages*", Computer Networks 33, Elsevier Science Publishers B.V., pp. 247-255. Jun. 1, 2000.

European Patent Office Communication, European Search Report and Annex to the European Search Report; Application No. 08165783.5-1527/2045734; Ref. P111732EP00/CLH 5 pages, Jul. 14, 2009.

Chinese Office Action with English translation; Apllication No. 20100117358.4; pp. 10, Sep. 22, 2011.

* cited by examiner

110

|  | $w_1$ DOG | $w_2$ FOREST | $w_3$ TREE | $w_4$ GRAPHICS | $w_5$ COMPUTER |
|---|---|---|---|---|---|
|  |  |  |  |  |  |
| $w_0$ BINARY | 0.003 | 0.005 | 0.037 | 0.021 | 0.066 |
| $w_1$ DOG |  | 0.024 | 0.033 | 0.017 | 0.049 |
| $w_2$ FOREST |  |  | 0.092 | 0.004 | 0.052 |
| $w_3$ TREE |  |  |  | 0.042 | 0.056 |
| $w_4$ GRAPHICS |  |  |  |  | 0.222 |

|  | $w_0$ BINARY | $w_1$ DOG | $w_2$ FOREST | $w_3$ TREE | $w_4$ GRAPHICS | $w_5$ COMPUTER |
|---|---|---|---|---|---|---|
| $w_0$ BINARY | 1 | 0.004 | 0.005 | 0.016 | 0.020 | 0.037 |
| $w_1$ DOG | 0.018 | 1 | 0.022 | 0.026 | 0.016 | 0.047 |
| $w_2$ FOREST | 0.013 | 0.013 | 1 | 0.055 | 0.008 | 0.026 |
| $w_3$ TREE | 0.071 | 0.029 | 0.102 | 1 | 0.034 | 0.060 |
| $w_4$ GRAPHICS | 0.071 | 0.013 | 0.012 | 0.026 | 1 | 0.255 |
| $w_5$ COMPUTER | 0.360 | 0.112 | 0.103 | 0.128 | 0.716 | 1 |

|  | WORD 1 | WORD 2 | WORD 3 | [...] | WORD 50,000 |
|---|---|---|---|---|---|
| WORD 1 | ----- | 0.005 | 0.037 | [...] | 0.066 |
| WORD 2 |  | ----- | 0.033 | [...] | 0.049 |
| WORD 3 |  |  | ----- | [...] | 0.052 |
| [...] |  |  |  | ----- | [...] |
| WORD 50,000 |  |  |  |  | ----- |
| AVERAGE | AA1 | AA2 | AA3 | [...] | AA50,000 |

AUTOMATIC GENERATION OF ONTOLOGIES USING WORD AFFINITIES

RELATED APPLICATION

This application claims benefit under 35 U.S.C. §119(e) of U.S. Provisional Application Ser. No. 60/977,770, titled "Automatic Generation of Ontologies Using Word Affinities," filed Oct. 5, 2007, by David Marvit et al.

TECHNICAL FIELD

The present invention relates generally to lexigraphical analysis and, more particularly, to automatic generation of ontologies using word affinities.

BACKGROUND

A corpus of data may hold a large amount of information, yet finding relevant information may be difficult. Keyword searching is the primary technique for finding information. In certain situations, however, keyword searching is not effective in locating information.

BRIEF DESCRIPTION OF THE FIGURES

FIG. 3 illustrates an example of an affinity matrix that records basic affinities;

FIG. 4 illustrates an example of an affinity matrix that records directional affinities;

DETAILED DESCRIPTION

Overview

Figure 1:
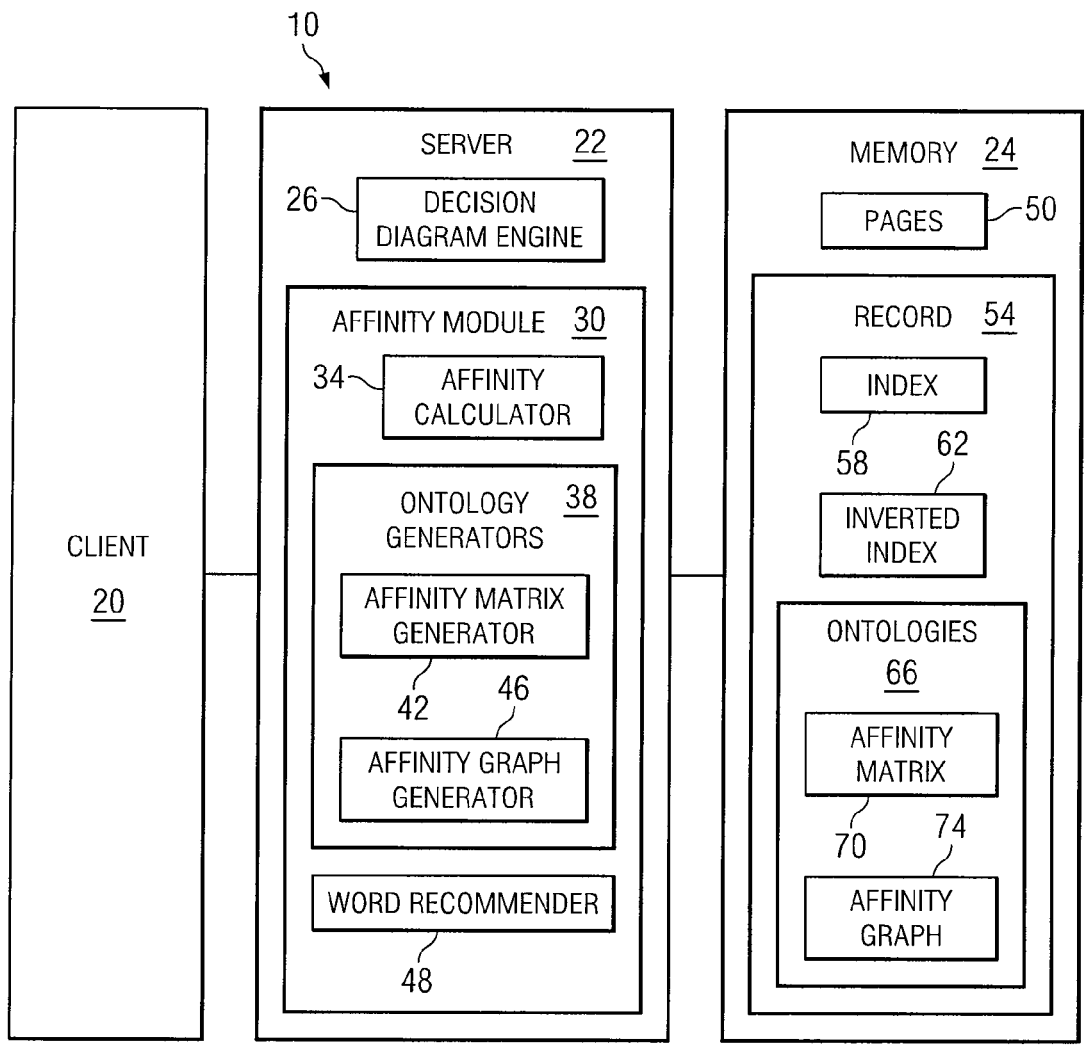
FIG. 1 illustrates one embodiment of a system that generates an ontology of a language from the affinities between the words of the language.

In one embodiment, generating an ontology includes accessing an inverted index that comprises inverted index lists for words of a language. An inverted index list corresponding to a word indicates pages that include the word. A word pair comprises a first word and a second word. A first inverted index list and a second inverted index list are searched, where the first inverted index list corresponds to the first word and the second inverted index list corresponds to the second word. An affinity between the first word and the second word is calculated according to the first inverted index list and the second inverted index list. The affinity describes a quantitative relationship between the first word and the second word. The affinity is recorded in an affinity matrix, and the affinity matrix is reported.

EXAMPLE EMBODIMENTS

In particular embodiments, creating and querying a domain ontology may include the following:

1. Collect documents in a domain. In particular embodiments, a document is a collection of terms. A document may comprise readable text, for example, a book of the New Testament. A document need not comprise text in narrative form, for example, a document may comprise a set of user-entered tags that individually and collectively describe the content of an image. A collection of documents may be referred to as a "domain corpus."

2. Identify the terms of interest ("dictionary terms") in the domain. Examples of terms include a word (such as "tree"), a phrase (such as "graph algorithm"), a named entity (such as "New York"), etc. A term (or concept) may have different forms. In certain cases, different words are used for the same concept, for example, "kidney stones" and "kidney calculi" refer to the same concept, "kidney stones." In other cases, a word stem may have many inflected variants, for example, the word stem "tree" has inflected variants "tree" and "trees." In particular embodiments, forms of the same term may be treated as mapped to the same term. Any suitable form of a dictionary term may appear in a document, but the particular dictionary term need not appear in any document.

Examples of methods for identifying dictionary terms include using a human-generated dictionary for a specific domain, for example, a medical dictionary. In particular embodiments, a list of dictionary terms may be automatically generated from a set of strings of text in a corpus. The strings may be indexed and sorted by frequency, and strings with frequency above a threshold may be selected. Other suitable statistical method may be used to determine terms. In particular embodiments, "word" may be interchangeable with "term" and "dictionary term."

3. Calculate the number of co-occurrences of dictionary terms in a given co-occurrence context. Two terms co-occur if they each appear at least once within the same co-occurrence context. Examples of co-occurrence contexts include a document and a paragraph.

4. Create a directed weighted graph that comprises the domain ontology. The directed weighted graph includes dictionary terms as the nodes and affinities as the weights of the edges. "Directed weighted graph" may be used as the actual representation of the same information that can be represented by any suitable data structure, e.g., a matrix, a Binary Decision Diagram, or a collection of Binary Decision Diagrams.

5. Apply a procedure to query the directed weighted graph. Given one or more dictionary terms as input, the procedure outputs one or more dictionary terms related to the input dictionary terms. For example, the procedure may outputs a sorted list of one or more terms that have the highest differential directional affinity (described below) towards one or more input terms. In this case, the output includes terms that are more closely related to the input terms, in relation to the domain that the ontology addresses.

Any suitable definitions of affinity may be used. In particular embodiments, the following may be used:

1. Basic Affinity a. The basic affinity (A) between terms A and B may be defined as the ratio of the number of co-occurrence contexts that include both terms A and B over the number of co-occurrence contexts that include either of the terms A or B:

$$A(A,B) = |AB|/|A \text{ or } B|$$

b. The basic affinity (A) between terms A and B may also be defined as the ratio of the number of co-occurrence contexts that include both terms A and B over the maximum of either the number of co-occurrence contexts that include A or the number of co-occurrence contexts that include B:

$$A(A,B) = |AB|/\max(|A|,|B|)$$

2. Directional Affinity

The directional affinity (DAff) between terms A and B may be defined as the conditional probability of observing B, given that A was observed in a co-occurrence context:

$$DAff(A,B)=|AB|/|A|$$

That is, directional affinity may be the number of co-occurrence contexts that include both terms A and B, over the number of co-occurrence contexts that include term A. Generally, DAff(A,B) differs from DAff(B,A).

3. Differential Directional Affinity

The differential directional affinity (DiffDAff) between terms A and B may be defined as the directional affinity between terms A and B minus a factor that accounts for the common-ness of the term B in the corpus. The common-ness of the term B in the corpus may be a statistical value over the basic affinity or directional affinity values of the term B towards the other terms in the corpus. In particular embodiment, the common-ness of the term B in a corpus may be the average affinity (AA) of term B, which yields the following definition of differential directional affinity:

$$DiffDAff(A,B)=DA(A,B)-AA(B)$$

The average affinity (AA), or average directional affinity, of a term B may be defined as:

$$AA(B)=AVERAGE\_x DAff(x,B)$$

That is, average affinity may be the average of the directional affinities of a term B over the other terms in the co-occurrence contexts.

FIG. 1 illustrates one embodiment of a system 10 that generates an ontology of a language from the affinities between the words of the language. An ontology of a language represents the words of the language and the relationships among the words. The affinity between words describes the relationship between the words. In one embodiment, system 10 calculates affinities as quantitative values. These values may be used to generate affinity matrices and affinity graphs that serve as the ontology of a language.

Examples of affinities include a basic, directional, average, differential, and/or other affinity. In certain embodiments, the directional affinity DA between words A and B may be defined as the conditional probability of observing B given that A was observed:

$$DA(A,B)=|AB|/|A|$$

In certain embodiments, directional affinity may be calculated on a specific inverted index II for a given subset of words and a dictionary D, where index II includes, for example, entries $I(w_i)$ and $I(w_j)$ for words $w_i$ and $w_j$. For each pair of words $w_i$ and $w_j$ in D, DA(i,j) may be defined as the values in the conjunction of entries $I(w_i),I(w_j)$ in II divided by the number of values in $I(w_i)$. In general, DA(i,j) is not necessarily equal to DA(j,i). The results may be stored in any suitable manner, for example, row-wise, where the D(1,i) are stored, then the D(2,j) are stored, and so on. For each row i, $|I(w_j)|$ may be stored, followed by the cardinalities of the conjunctions with the $w_j$.

In certain embodiments, directional affinity may be calculated in three phases. In Phase 0, the II entries corresponding to D are read. For parameters (s, o), only the elements that are of the form ks+o are kept. This step allows calculation of DA tables for very large inverted indices. In Phase 1, the conjunctions are calculated row-wise only for DA(i,j) where i. In Phase 2, the calculated upper-triangular UT DA array is read. From that, the lower-triangular part is obtained as the transpose of UT. In certain embodiments, multiple DA arrays of the same dimension may be merged into a single array. A DA array on a large II can be calculated as the $sum_{i=0 \ldots (s-1)}$ DA with parameters (s, i).

In certain embodiments, an average affinity (or average directional affinity) may be calculated from the directional affinity. In certain embodiments, an average affinity AA vector may be calculated on a specific directional affinity DA array:

$$AA(B)=AVERAGE\_x D(x,B)$$

In certain embodiments, the DA may be stored row-wise, so the calculation may proceed in parallel for the entries in AA. In particular, AA may be generated by summing up the rows of the DA as they are read from the disk and, at the end, normalized by the number of the dictionary entries.

In certain embodiments, a differential affinity DiffAff (or differential directional affinity DiffDAff) between words $w_i$ and $w_j$ may be defined as follows:

$$DiffAff(i,j)=DA(i,j)-AA(j)$$

In the illustrated embodiment, system 10 includes a client 20, a server 22, and a memory 24. Client 20 allows a user to communicate with server 22 to generate ontologies of a language. Client 20 may send user input to server 22, and may provide (for example, display or print) server output to user. Server system 24 manages applications for generating ontologies of a language. Memory 24 stores data used by server system 24.

Memory 24 stores pages 50 and a record 54. A page 50 (or document) may refer to a collection of words and/or images. A word may comprise one or more characters (for example, letters, numbers, spaces, or punctuation) that has one or more particular meanings. Examples of words include "San Francisco," "plants," "non-stop," and "N9ne." A page with images may be analyzed using tags or other metadata associated with the images.

Examples of a page 50 include one or more words, one or more paragraphs, one or more pages, one or more sections, one or more chapters, one or more documents, one or more books, one or more web pages, correspondence (for example, email and instant messages), and/or other collections of words. That is, a document can be a word, a paragraph, a section, an image, a page, a traditional document, a chapter, a page section, a book, a webpage, an email, a message, a weblog, etc. A page 50 may be identified by a page identifier. In certain embodiments, a set of pages 50 may belong to a corpus. A corpus may be associated with a particular subject matter, community, organization, or other entity.

Record 54 describes pages 50. In the embodiment, record 54 includes an index 58, an inverted index 62, and ontologies 66. Index 58 includes index lists, where an index list for a page 50 indicates the words of the page 50. Inverted index 62 includes inverted index lists, where an inverted index list for a word (or set of words) indicates the pages 50 that include the word (or set of words). In one example, list $W_i$ includes page identifiers of pages 50 that include word $w_i$. List $W_i$ & $W_j$ includes page identifiers of conjunction pages 50 that include both words $w_i$ and $w_j$. List $W_i+W_j$ includes page identifiers of disjunction pages 50 that include either word $w_i$ or $w_j$. $P(W_i)$ is the number of pages 50 of $W_i$, that is, the number of pages 50 that include word $w_i$.

In one embodiment, a list (such as an index list or an inverted index list) may be stored as a binary decision diagram (BDD). In one example, a binary decision diagram $BDD(W_i)$ for set $W_i$ represents the pages 50 that have word $w_i$. The satisfying assignment count Satisf(BDD($W_i$)) of a BDD($W_i$) yields the number P($W_i$) of pages 50 that have word $w_i$:

$$P(W_i) = \text{Satisf}(\text{BDD}(W_i))$$

Accordingly, $$P(W_i \& W_j) = \text{Satisf}(\text{BDD}(W_i) \text{ AND } \text{BDD}(W_j))$$

$$P(W_i + W_j) = \text{Satisf}(\text{BDD}(W_i) \text{ OR } \text{BDD}(W_j))$$

Examples of storing lists as BDDs are described in more detail below.

Ontologies 66 represent the words of a language and the relationships among the words. In one embodiment, an ontology 66 represents the affinities between words. In the illustrated example, ontologies 66 include an affinity matrix 70 and an affinity graph 74. Examples of affinity matrices 70 are described with the reference to FIGS. 3 through 5. An example of an affinity graph 74 is described with reference to FIG. 6.

Server 22 includes decision diagram engine 26. In certain embodiments, decision diagram engine 26 stores lists (such as index lists and/or inverted index lists) as BDDs. In one embodiment, a list may be compressed and then stored as a binary decision diagram (BDD). A list may be compressed in any suitable manner. In one example, the elements of a list are sorted according to size to yield a sorted list, and the pairwise differences of the elements of the sorted list are calculated to yield a pairwise difference list. The elements of the pairwise difference list are then γ-encoded to yield a γ-encoded list. For an example list [23, 125, 37, 54, 86, 33], the sorted list is [23, 33, 37, 54, 86, 125], and the pairwise difference list is [23, 10, 4, 17, 32, 39].

To encode the elements x of the pairwise difference list, each element $x>0$ is factored into $2^e+m$, where $e=\lfloor \log_2 x \rfloor$. The γ-code of x is the concatenation of $(e+1)$ in unary with m in binary. For example, if $x=13=2^3+5$, then $e=3$ and $m=5$. The unary representation of $(e+1)$ is 1110, the binary representation of m is 101, so the γ-code for x is 1110101. The γ-encoded list for the above example list is:

[111100111, 1110010, 11000, 111100001, 11111000000, 11111000111]

Decision diagram engine 26 may store an index as a BDD in any suitable manner. In one embodiment, an index list is represented by a Boolean function, and then the Boolean function is represented by a BDD. A list may be represented as a Boolean function in any suitable manner. According to one example of a technique for representing a list, each element of the list is expressed as a binary value with bit values $b_1 \ldots b_i \ldots b_n$. Each binary value is then represented by variables $x_1 \ldots x_i \ldots x_n$, where each variable $x_i$ represents bit value $b_i$. For example, the list [23, 33, 37, 54] is expressed in binary as [010111, 100001, 100101, 110110]. The list may be represented by the Boolean function:

$$f = \bar{x}_1 x_2 \bar{x}_3 x_4 x_5 x_6 + x_1 \bar{x}_2 \bar{x}_3 \bar{x}_4 \bar{x}_5 x_6 + x_1 \bar{x}_2 \bar{x}_3 x_4 \bar{x}_5 x_6 + x_1 x_2 \bar{x}_3 x_4 x_5 \bar{x}_6.$$

As another example, the list [8, 11, 12, 15] is expressed in binary as [1000, 1011, 1100, 1111]. The list may be represented by the Boolean function:

$$f = x_1 \bar{x}_2 \bar{x}_3 \bar{x}_4 + x_1 \bar{x}_2 x_3 x_4 + x_1 x_2 \bar{x}_3 \bar{x}_4 + x_1 x_2 x_3 x_4$$

According to another example of a technique for representing a list, each element of the list is expressed in a $2^k$ base as a value with base-$2^k$ digits. Each base-$2^k$ digit is one-hot encoded to yield bit values $b_i$. The bit values are then represented by variables $x_i$. For example, in base $2^2$ element 54 is 312 with base-$2^2$ digits 3, 1, and 2. Each base-$2^2$ digit is then one-hot encoded to yield bit values 1000:0010:0100. Element 54 may be encoded by the Boolean function:

$$g = x_1 \bar{x}_2 \bar{x}_3 \bar{x}_4 \bar{x}_5 \bar{x}_6 x_7 \bar{x}_8 \bar{x}_9 x_{10} \bar{x}_{11} \bar{x}_{12}.$$

Although the number of variables used in this technique is larger, this technique may lead to improved sharing and more compact representation, especially with ZDDs, which store negative literals more efficiently. In particular embodiments, constructing a Boolean function may include constructing a minterm from each element and then ORing the minterms.

Decision diagram engine 26 may represent a Boolean function by a BDD in any suitable manner. An example of a BDD is described in more detail with reference to FIG. 2.

Figure 2:
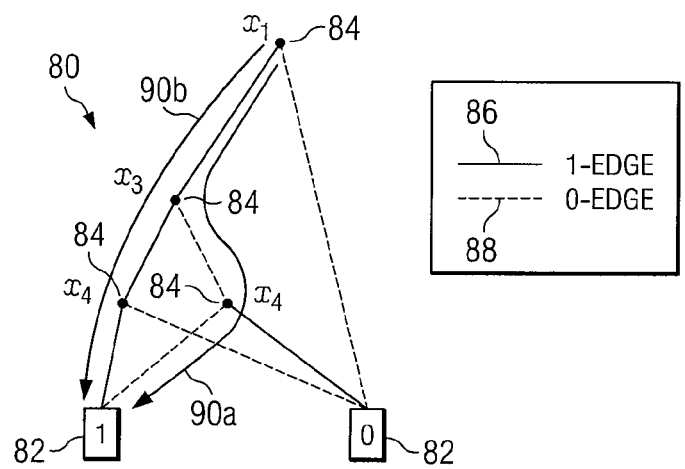
FIG. 2 illustrates an example of a binary decision diagram.

FIG. 2 illustrates an example of a BDD 80. In the illustrated example, BDD 80 is a rooted directed acyclic graph (DAG) representing a Boolean function $f$. BDD 80 includes terminal nodes 82 and decision nodes 84 (one decision node being a root node). Terminal nodes 82 include a 0-terminal and a 1-terminal that represent Boolean functions 0 and 1, respectively. A decision node 84 corresponds to a sub-function $f$ and is labeled by a Boolean variable $v=x_i$. A non-terminal node 84 has an outgoing 1-edge 86 and an outgoing 0-edge 88 pointing to child nodes. A 1-edge 86 points to the sub-BDD that represents function $v \cdot f$, and a 0-edge 88 points to the sub-BDD that represents function $\bar{v} \cdot f$. In other words, a 1-edge represents an assignment of v to 1, and a 0-edge represents an assignment of v to 0.

A path from the root node to the 1-terminal represents a set of variable assignments setting the represented Boolean function to 1. A path from the root node to the 0-terminal represents a set of variable assignments setting the represented Boolean function to 0. In the illustrated example, BDD 80 represents function $f$ shown by paths 90 (90$a$,$b$) from the $x_1$ node 84 to terminal node 82 for 1. In the example, paths 90$a$ and 90$b$ yield function $f = x_1 x_3 x_4 + x_1 \bar{x}_3 \bar{x}_4$, which, as discussed above, represents list [8, 11, 12, 15].

Referring back to FIG. 1, decision diagram engine 26 may use any suitable BDD to store a list. Examples of BDDs include reduced ordered BDDs (ROBDDs), partitioned ordered binary decision diagrams (POBDDs), zero-suppressed decision diagrams (ZDDs), nano binary decision diagrams (nanoDDs), zero-suppressed nano binary decision diagrams (nanoZDDs), other suitable binary decision diagrams, and/or a combination of any of the preceding. In a ROBDD, isomorphic subgraphs are not present, and the order of the variables from the root node of the BDD to a terminal node are the same for all paths. In a ZDD, a node is excluded if the node is a negative literal. In other BDDs, a node is excluded if both edges of the node point to the same node. Examples of the other types of BDDs are described in more detail below.

In particular embodiments, decision diagram engine 26 generates BDDs by compacting BDDs. In one embodiment, decision diagram engine 26 may compact a BDD by discarding variable ordering and correlating a location specified by a pointer to both the value of the pointer and the position of the parent node. In particular embodiments, a node structure may include a variable identifier (ID), THEN/ELSE pointers, and/or a 0-edge pointer. A variable ID labels a node. In particular embodiments, labels for S nodes requires at least n bits, where $2^n = S$. In one example, a BDD has $S=32$ nodes, where S represents the number of nodes. In the example, labels for 32 nodes requires at least five bits, since $2^5 = 32$. THEN/ELSE pointers point to child nodes. In particular embodiments, a THEN pointer is a 1-edge pointer and an ELSE pointer is a 0-edge pointer. In particular embodiments, a node structure may include a 0-edge negated flag that indicates whether zero suppression negates the node. If the decision diagram is a ZDD, the node structure need not include a 0-edge negated flag.

In the example, the minimum information used for each child node of the BDD may be given by:

Variable ID: 5 bits
0-edge negated flag: 1 bit
THEN/ELSE pointers: 2*⌈ log(S)⌉ bits Decision diagram engine 26 identifies a number of bytes each node of the BDD uses. In the example, each node requires $$\left\lceil \frac{((5+1+2*\lceil \log(S) \rceil)+7)}{8} \right\rceil$$

bytes.

In particular embodiments, decision diagram engine 26 further compacts a BDD. To further compact a BDD, decision diagram engine 26 may drop the log(S) bits for the THEN/ELSE pointers, and may correlate the value of each pointer and the value (or position) of its parent node to the location to which the pointer points. Under such conditions, allotting only one or two bytes to each pointer reduces per-node memory requirements.

In particular embodiments, decision diagram engine 26 compacts a decision diagram and appropriately resizes tables (and allocates more bits per node) for storing the decision diagram as the diagram becomes larger. In particular embodiments, decision diagram engine 26 starts building the decision diagram as a compact decision diagram. Instead of resizing, decision diagram engine 26 directly applies decomposition/composition to graph construction to directly convert a compact decision diagram to an unreduced diagram.

In particular embodiments, a compact decision diagram facilitates communication between parallel platforms. In an example, a first platform operates parallel to a second platform. The first platform may generate a decision diagram, make the decision diagram compact for communication to the second platform, and communicate the compact decision diagram to the second platform. The second platform may reconstruct the decision diagram from the compact decision diagram for processing at the second platform.

In particular embodiments, nano decision diagrams (nanoDDs) may be used. A BDD may be stored using node structures that describe the variables and locations of the nodes of the BDD. If n represents the number of variables and d represents the number of nodes, then $s_n = \lceil \log(n) \rceil$ bits are sufficient to index a variable labeling a node. Moreover, if nodes are stored consecutively in memory, $s_d = \lceil \log(d) \rceil$ bits are sufficient to identify the location of the node.

A node of a nanoDD may be structured as follows:

| variable: $s_n$ bits | 1-edge: $s_d$ bits | 0-edge: $s_d$ bits |
| --- | --- | --- |

Accordingly, a single nanoDD node uses $2s_d + s_n$ bits.

Nodes may be stored consecutively in a depth-first traversal order. Depth-first traversal starts from the root node and ends at terminal node 1, following 0-edges before 1-edges. Accordingly, information may be incrementally extracted from a nanoDD during depth-first traversal. Terminal nodes need not be explicitly stored since they can be assigned fixed virtual positions.

In particular embodiments, nanoDDs are useful in any suitable application of BDDs. Examples of suitable applications include integrated circuit (IC) synthesis, IC formal verification, etc. In particular embodiments, nanoDDs support any suitable BDD operations.

Particular embodiments facilitate storing a BDD more efficiently. In particular embodiments, storing a BDD more efficiently enables a central processing unit (CPU) cache to store more nodes of the BDD, which may facilitate processing of the BDD by the CPU. Particular embodiments facilitate reducing the number of bytes required by each node of a graph representing a BDD, which may facilitate reducing the size of the BDD. Particular embodiments may facilitate reducing the size of a BDD without reducing the number of nodes of the BDD. Particular embodiments may facilitate reducing the size a BDD while keeping the BDD useful for functional manipulation. Particular embodiments may facilitate using BDDs in mobile consumer applications, which often require the compression of data.

Server 22 includes an affinity module 30. Affinity module 30 calculates an affinity for a word pair, records the affinity in an affinity matrix 70, and reports the affinity matrix 70. Affinity module 30 may also generate an affinity graph 74.

Affinity module 30 includes an affinity calculator 34, ontology generators 38, and a word recommender 48. Affinity calculator 34 calculates any suitable type of affinity for a word $w_i$ or for a word pair comprising a first word $w_i$ and a second word $w_j$. Examples of affinities include a basic, directional, average, differential, and/or other affinity.

In one embodiment, word recommender 48 receives a seed word and identifies words that have an affinity with the seed word that is greater than a threshold affinity. The threshold affinity may have any suitable value, such as greater than or equal to 0.25, 0.5, 0.75, or 0.95. The threshold affinity may be pre-programmed or user-designated.

A basic affinity may be calculated from the amount (for example, the number) of pages 50 that include words $w_i$ and/or $w_j$. The conjunction page amount represents the amount of pages 50 that include both word $w_i$ and word $w_j$, and the disjunction page amount represents the amount of pages 50 that include either word $w_i$ or word $w_j$, but not both. The basic affinity may be given by the conjunction page amount divided by the disjunction page amount. In one example, a number of conjunction pages indicates the number of pages comprising word $w_i$ and word $w_j$, and a number of disjunction pages indicates the number of pages comprising either word $w_i$ or word $w_j$. The basic affinity may be given by the number of conjunction pages divided by the number of disjunction pages:

$$\text{Affinity}(w_i, w_j) = P(W_i \& W_j)/P(W_i + W_j)$$

FIG. 3 illustrates an example of an affinity matrix 110 that records basic affinities. In the illustrated example, affinity matrix 110 records the pairwise affinities of words $w_1, \ldots, w_5$. According to affinity matrix 110, the affinity between words $w_0$ and $w_1$ is 0.003, between words $w_0$ and $w_2$ is 0.005, and so on.

Referring back to FIG. 1, an affinity group includes word pairs that have high affinities towards each another, and may be used to capture the relationship between words $w_1$ and $w_2$ with respect to page content. A high affinity may be designated as an affinity over an affinity group threshold. A threshold may be set at any suitable value, such as greater than or equal to 0.50, 0.60, 0.75, 0.90, or 0.95. A word may belong to more than one affinity group. In one embodiment, an affinity group may be represented as a BDD. The pointer for the BDD may be stored with each word of the group in inverted index 62.

A directional affinity may be used to measure the importance of word $w_i$ with respect to word $w_j$. Affinity calculator 34 calculates the directional affinity of word $w_i$ given word $w_j$ from the amount (for example, the number) of pages 50 that include words $w_i$ and $w_j$. A word $w_j$ page amount represents the amount of pages 50 that include word $w_i$. The directional affinity of word $w_i$ given word $w_j$ may be given by the conjunction page amount divided by word $w_j$ page amount. For example, a number of word $w_j$ pages indicates the number of pages 50 that include word $w_i$. The directional affinity of word $w_i$ given word $w_j$ may be given by the number of conjunction pages 50 divided by number of word $w_i$ pages 50:

$$DAffinity(w_i,w_j)=P(W_i \& W_j)/P(W_i)$$

DAffinity($w_i$, $w_j$) is not the same as DAffinity($w_j$, $w_i$). A high directional affinity DAffinity($w_i$, $w_j$) between words $w_i$ and $w_j$ indicates a higher probability that a page 50 includes word $w_i$ given that the page 50 includes word $w_j$. In one example, pages [1 2 3 4 5 6] include word $w_i$, and pages [4 2] include word $w_j$. The pages that include word $w_j$ also include word $w_i$, so from the viewpoint of word $w_j$, word $w_i$ is of high importance. Only in one-third the pages that include $w_i$ also include word $w_j$, so from the viewpoint of word $w_i$, word $w_j$ is of low importance.

FIG. 4 illustrates an example of an affinity matrix 120 that records the directional affinities for words $w_0, \ldots, w_5$. In the example, words 124 are A words, and words 128 are B words. The rows of matrix 120 record the affinity of a B word given an A word, and the columns of affinity matrix 120 record the affinity of an A word given a B word.

Referring back to FIG. 1, the average affinity of a word $w_i$ calculated with respect to the other words $w_j$. In one embodiment, the average affinity may be the average of the affinities between word $w_i$ and every other word $w_j$. In another embodiment, the average affinity may be determined from the conditional probability $P(w_i|w_j)$ of word $w_i$ given $w_j$. The average affinity of word $w_i$ of N words may be given by:

$$AveAff(w_i) = \frac{1}{N}\sum_{j=1}^{N} P(w_i|w_j)$$

Figures 5, 6:
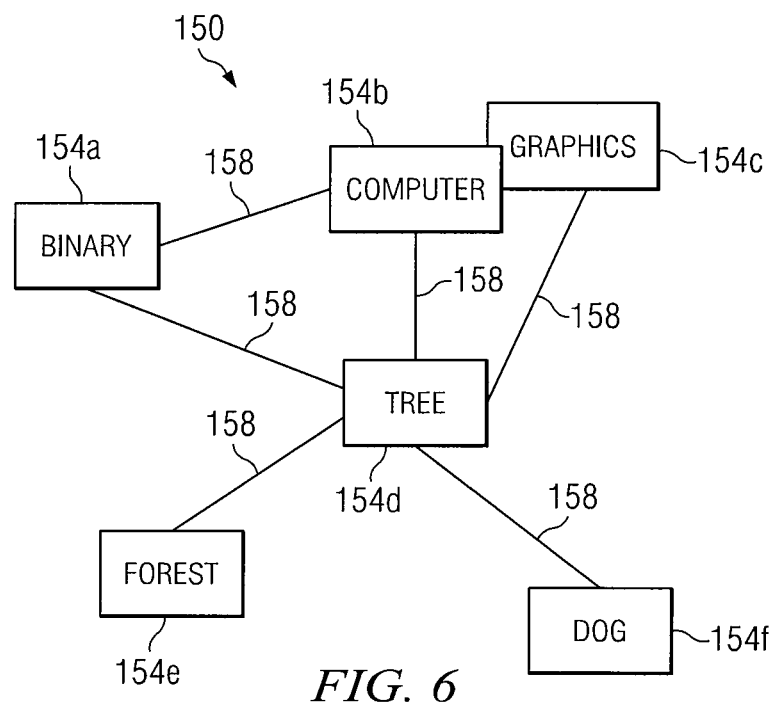
FIG. 5 illustrates an example of an affinity matrix that records average affinities.
FIG. 6 illustrates an example of an affinity graph.

FIG. 5 illustrates an example of an affinity matrix 140 that records average affinities. Rows 142 record basic affinities for word 1 through word 50,000. Row 144 records the average affinities of word 1 through word 50,000.

Referring back to FIG. 1, the average affinity of a word may indicate the depth of the word. A word with a lower average affinity may be regarded as a deeper word, and a word with a higher average affinity may be regarded as a shallower word. Deeper words tend to be more technical, specific, and precise. A page 50 with a higher percentage of deeper words may be regarded as a deeper page, and a page 50 with a lower percentage of deeper words may be regarded as a shallower page. In one embodiment, a user may specify the depth of word and/or pages 50 to be retrieved.

The deeper words of a page 50 may form one or more clusters of highly related words. A cluster may represent a common idea, or theme. The number of themes of a page 50 may indicate the specificity of the page 50. A page 50 with fewer themes may be regarded as more specific, and a page 50 with more themes may be regarded as less specific.

The differential affinity for word $w_i$ with respect to word $w_j$ is the directional affinity between words $w_i$ and $w_j$ minus the average affinity of word $w_j$ for all other words. Differential affinity may be expressed as:

$$DiffAff(w_i,w_j)=DAffinity(w_i,w_j)-AveAff(w_j)$$

Differential affinity removes the bias caused by the general tendency for word $w_j$ to occur in pages 50. In particular circumstances, differential affinity may provide a more accurate indication of the probability that a page includes word $w_i$ given that the page includes word $w_j$.

Differential affinities may be used in a variety of applications. In one example, differential affinities among people's names may be used to study social networking. In another example, differential affinities among language elements may be used to study natural language processing. In another example, differential affinities among products may be used to study marketing.

Affinity calculator 34 may use any suitable technique to search inverted index lists to calculate affinities. For example, to identify pages that include both words $w_i$, and $w_j$, affinity calculator 34 may search list $W_i$ of word $w_i$ and list $W_j$ of word $w_j$ for common elements, that is, common page identifiers. In one embodiment, elements are read one at a time, starting from the beginning of the lists, until the common elements are detected. As an example, lists $W_1$ and $W_2$ include the following elements:

$W_1$: 10, 20, 23, 36, 47, 52
$W_2$: 16, 18, 23, 47

Pointers $p_1$, $p_2$ initially point to elements 10 and 16, respectively. Pointer $p_1$ points to an element that is less than the element to which $p_2$ points, so $p_1$ moves forward to the next element 20. Pointer $p_2$ now points to a smaller element, so $p_2$ moves to 18. Element 18 is less than 20, so $p_2$ proceeds to 23. Pointer $p_1$ proceeds to 23, a common element, so the element is output. At this stage, both pointers $p_1$, $p_2$ move forward to elements 47 and 47, respectively, a common element. Accordingly, element 47 is output. Pointer $p_2$ has reached the end of list $W_2$, so no more common elements can be detected, and the process ends.

Affinity calculator 34 may perform an element retrieval operation to move the pointer through the elements of a list. An example of an element retrieval operation is a next greater element retrieval operation get_next_element_greq(L, E) that retrieves a next element of list L that is greater than or equal to element E. The operation skips elements that have no importance for a particular search, which may yield a more efficient search.

In one example, a nanoDD is traversed. An array A records current variable assignments as the nanoDD is traversed. A depth-first traversal is performed to obtain the first element. The depth-first traversal starts from the root node and follows the 0-edges until the terminal node 1 is reached.

Operation get_next_element_greq(L, E) is called to retrieve the next element. The operation determines variable assignments that are common to element E and array A. The operation backtracks until the first non-common variable from the top is reached. If there are no common assignments, the root node is retrieved. The operation traverses the nanoDD according to the remaining variable assignments designated by element E.

In one example, the get_next_element_greq(L, element) operation may be performed on BDD 80. As discussed above, BDD 80 represents function $f=x_1x_3x_4+x_1\bar{x}_3\bar{x}_4$ that encodes list [8, 11, 12, 15]. Path 90a yields $(x_1,x_2,x_3,x_4)=(1, 0, 0, 0)$, which is the first element 8. Operation get_next_element_greq(L, 9) retrieves the next element greater than 8. The first three variable assignments of (1, 0, 0, 0) and (1, 0, 0, 1) are the same, so the operation backtracks to variable $x_3$ along path 90b. The traversal yields (1, 0, 1, 1), which is element 11.

In one embodiment, get_next_element_greq(L, E) may be used to identify pages that include both words of a word pair. The operation may identify common elements of inverted index lists of the words, where an inverted index list of a word indicates the pages that include the word.

As an example, a first list includes [8, 11, 12, 15] and a second list includes [7, 13, 15]. The first elements 8 and 7 of the lists are obtained. Element 8 is greater than 7, so get_next_element_greq(L, 8) searches the second list and obtains element 13. Element 13 is greater than 8, so get_next_element_greq(L, 13) then searches the first list. The operation detects that (1, 1, 0, 1) (corresponding to 13) has only the first variable common with (1, 0, 0, 0) (corresponding to 8). The operation backtracks to variable $x_1$ and traverses down BDD 80 according to (1, 1, 0, 1), eventually ending at (1, 1, 1, 1).

In certain embodiments, affinity calculator 34 may calculate any other suitable affinity. As an example, the affinity of a document with respect to a target word may be determined from the absolute number of words in the document that have a directional affinity above a threshold to the target word. As another example, the values of affinity below some number may be thresholded.

In certain embodiments, affinity calculator 34 may calculate the affinity between documents. As an example, the affinities between the deeper words of one document and the deeper words of another document may be calculated. The affinities between the deeper words may be gathered in a histogram and used to derive a single affinity between the documents. Similarly, the affinity between a document and a collection of documents can be derived.

An ontology generator 38 generates an ontology 66 of a language, such as an affinity matrix 70 or an affinity graph 74. An ontology may be generated from any suitable affinity, such as a basic, directional, average, differential, and/or other affinity. Ontologies 66 may be generated from words selected from a language in any suitable manner. For example, words from a commonly used portion of the language or words related to one or more particular subject matter areas may be selected.

Ontology generators 38 include an affinity matrix generator 42 and an affinity graph generator 46. Affinity matrix generator 42 generates an affinity matrix 70 that records affinities between words. Affinity graph generator 46 generates an affinity graph 74 that represents affinities between words. In an affinity graph 74, a node represents a word, and the distance between nodes represents the affinity between the words represented by the nodes. An affinity graph 74 may have any suitable number of dimensions.

FIG. 6 illustrates an example of an affinity graph 150. Affinity graph 150 includes nodes 154 and links 158. A node 154 represents a word. In the example, node 154a represents the word "binary." The distance between nodes 154 represents the affinity between the words represented by nodes 154. For example, a greater distance represents a greater affinity. A link 158 between the nodes indicates that the affinity between the words represented by the nodes 154 is above an affinity threshold. The affinity threshold may have any suitable value, for example, greater than or equal to 0.25, 0.5, 0.75, or 095.

Referring back to FIG. 1, a component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of generators 42 and 46 may be performed by one component, or the operations of affinity calculator 34 may be performed by more than one component. Additionally, operations of system 10 may be performed using any suitable logic comprising software, hardware, and/or other logic. As used in this document, "each" refers to each member of a set or each member of a subset of a set.

Modifications, additions, or omissions may be made to the examples of the matrices without departing from the scope of the invention. A matrix may include more, fewer, or other values. Additionally, the values of the matrix may be arranged in any suitable order.

Figure 7:
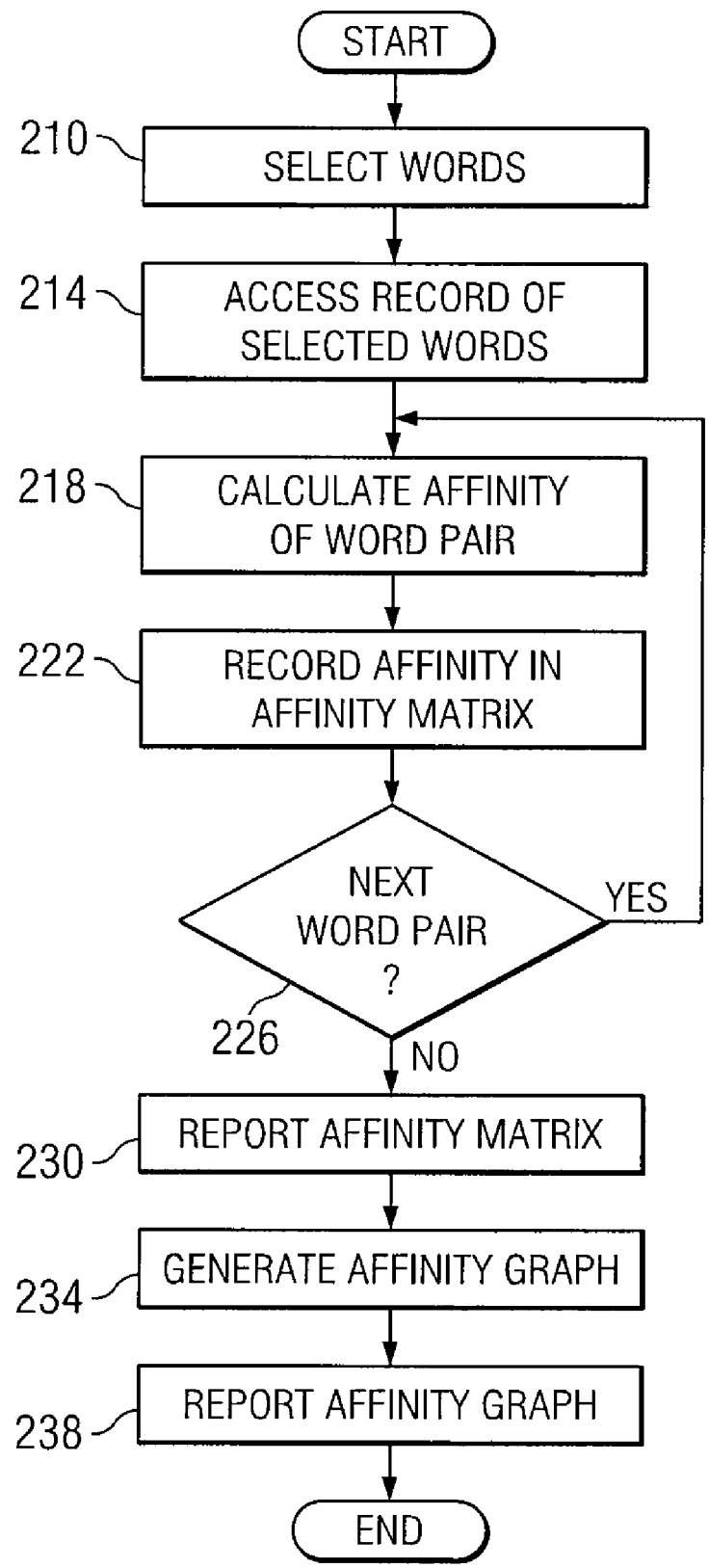
FIG. 7 illustrates one embodiment of a method for generating an ontology of a language that may be performed by the system of FIG. 1.

FIG. 7 illustrates one embodiment of a method for generating an ontology of a language. The method starts at step 210, where words of a language are selected for the ontology. The words may be selected in any suitable manner. For example, commonly used words or words related to a particular subject matter may be selected.

Affinity calculator 34 accesses record 54 of the selected words at step 214. Affinity calculator 34 may access inverted index 62 to retrieve lists of pages that include the selected words. The inverted index 62 may be expressed as BDDs.

Affinity calculator 34 calculates the affinity of a word pair of the selected words at step 218. Any suitable affinity may be calculated, for example, a basic, directional, average, differential, and/or other affinity may be calculated. Affinity calculator 34 records the affinity in an affinity matrix at step 222. Steps 218 and 222 are repeated for the word pairs of the selected words. If there is a next word pair at step 226, the method returns to step 218 to calculate the affinity of a next word pair. If there is no next word pair at step 226, the method proceeds to step 230.

Affinity matrix generator 42 reports the affinity matrix at step 230. The affinity matrix may be used to represent the ontology of the language. Affinity graph generator 46 generates an affinity graph at step 234. The affinity graph may also be used as an ontology of the language. The affinity graph is reported at step 238. The method then ends.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that the affinities between words of a language can be expressed as quantitative values. The affinities may be used to generate a matrix that serves as the ontology of the language. Certain embodiments of the invention may include none, some, or all of the above technical advantages. One or more other technical advantages may be readily apparent to one skilled in the art from the figures, descriptions, and claims included herein.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   accessing an inverted index stored in a tangible storage medium, the inverted index comprising a plurality of inverted index lists for a plurality of words of a language, an inverted index list corresponding to a word indicating one or more pages that include the word, each of the plurality of inverted index lists stored by representing the inverted index list by a Boolean function and generating a binary decision diagram corresponding to the Boolean function;
   for each word pair of the plurality of words, the word pair comprising a first word and a second word:
       searching a first inverted index list and a second inverted index list, the first inverted index list corresponding to the first word, the second inverted index list corresponding to the second word;
       calculating an affinity between the first word and the second word according to the first inverted index list and the second inverted index list, the affinity describing a quantitative relationship between the first word and the second word; and
       recording the affinity in an affinity matrix; and
   reporting the affinity matrix.

2. The method of claim 1, the calculating the affinity between the first word and the second word further comprising calculating a basic affinity between the first word and the second word by:
   establishing a number of conjunction pages indicating the number of pages comprising the first word and the second word;
   establishing a number of disjunction pages indicating the number of pages comprising either the first word or the second word; and
   dividing the number of conjunction pages by the number of disjunction pages.

3. The method of claim 1, the calculating the affinity between the first word and the second word further comprising calculating a directional affinity of the first word given the second word by:
   establishing a number of conjunction pages indicating the number of pages comprising the first word and the second word;
   establishing a number of first word pages indicating the number of pages comprising the first word; and
   dividing the number of conjunction pages by the number of first word pages.

4. The method of claim 1, the calculating the affinity between the first word and the second word further comprising calculating an average affinity of the first word by:
   for each word pair of the plurality of words, calculating a directional affinity between the words of the each word pair to yield a plurality of directional affinities; and
   calculating an average of the directional affinities.

5. The method of claim 1, the calculating the affinity between the first word and the second word further comprising calculating a differential affinity of the first word with respect to the second word by:
   calculating a directional affinity of the first word to the second word;
   calculating an average affinity of the second word; and
   subtracting the average affinity of the second word from the directional affinity of the first word to the second word.

6. The method of claim 1, further comprising storing an inverted index list of the plurality of inverted index lists by:
   representing the inverted index list by a Boolean function by performing the following for each element of the inverted index list:
       expressing the each element as a binary value comprising a plurality of bit values;
       representing each bit value with a variable of the Boolean function;
       constructing a minterm from the each element; and
       constructing the Boolean function by Oring the minterms; and
   generating a binary decision diagram corresponding to the Boolean function.

7. The method of claim 1, further comprising storing an inverted index list of the plurality of inverted index lists by:
   representing an inverted index list by a Boolean function by performing the following for each element of the inverted index list:
       expressing the each element as a $2^k$ base value comprising a plurality of base-$2^k$ digits; and
       encoding each base-$2^k$ digit to yield an encoded base-$2^k$ digit comprising a plurality of bit values;
       representing each bit value with a variable of the Boolean function; and
   generating a binary decision diagram corresponding to the Boolean function.

8. The method of claim 1, further comprising storing an inverted index list of the plurality of inverted index lists by:
   representing the inverted index list by a Boolean function; and
   generating a binary decision diagram corresponding to the Boolean function by:
       establishing a plurality of nodes of the binary decision diagram; and
       determining a node structure for each node.

9. The method of claim 1, the searching the first inverted index list and the second inverted index list further comprising:
   traversing a first binary decision diagram representing the first inverted index list; and
   traversing a second binary decision diagram representing the second inverted index list.

10. The method of claim 1, the searching the first inverted index list and the second inverted index list further comprising searching a first binary decision diagram and a second binary decision diagram, the first binary decision diagram representing the first inverted index list, the second binary decision diagram representing the second inverted index list, by repeating the following until the end of either the first inverted index list or the second inverted index list is reached:

establishing a current element of a current inverted index list comprising either the first inverted index list or the second inverted index list;

retrieving a next greater element from the other inverted index list;

comparing the next greater element and the current element; and recording a common element if the next greater element matches the current element.

11. One or more non-transitory computer-readable media encoding software that, when executed, is operable to:

access an inverted index stored in a tangible storage medium, the inverted index comprising a plurality of inverted index lists for a plurality of words of a language, an inverted index list corresponding to a word indicating one or more pages that include the word, each of the plurality of inverted index lists stored by representing the inverted index list by a Boolean function and generating a binary decision diagram corresponding to the Boolean function;

for each word pair of the plurality of words, the word pair comprising a first word and a second word:

search a first inverted index list and a second inverted index list, the first inverted index list corresponding to the first word, the second inverted index list corresponding to the second word;

calculate an affinity between the first word and the second word according to the first inverted index list and the second inverted index list, the affinity describing a quantitative relationship between the first word and the second word; and record the affinity in an affinity matrix; and report the affinity matrix.

12. The non-transitory computer-readable media of claim 11, the software further operable to calculate the affinity between the first word and the second word by calculating a basic affinity between the first word and the second word by:

establishing a number of conjunction pages indicating the number of pages comprising the first word and the second word;

establishing a number of disjunction pages indicating the number of pages comprising either the first word or the second word; and dividing the number of conjunction pages by the number of disjunction pages.

13. The non-transitory computer-readable media of claim 11, the software further operable to calculate the affinity between the first word and the second word by calculating a directional affinity of the first word given the second word by:

establishing a number of conjunction pages indicating the number of pages comprising the first word and the second word;

establishing a number of first word pages indicating the number of pages comprising the first word; and dividing the number of conjunction pages by the number of first word pages.

14. The non-transitory computer-readable media of claim 11, the software further operable to calculate the affinity between the first word and the second word by calculating an average affinity of the first word by:

for each word of the plurality of words, calculating a directional affinity between the words of the each word pair to yield a plurality of directional affinities; and calculating an average of the directional affinities.

15. The non-transitory computer-readable media of claim 11, the software further operable to calculate the affinity between the first word and the second word by calculating a differential affinity of the first word with respect to the second word by:

calculating a directional affinity of the first word to the second word;

calculating an average affinity of the second word; and subtracting the average affinity of the second word from the directional affinity of the first word to the second word.

16. The non-transitory computer-readable media of claim 11, the software further operable to store an inverted index list of the plurality of inverted index lists by:

representing the inverted index list by a Boolean function by performing the following for each element of the inverted index list:

expressing the each element as a binary value comprising a plurality of bit values;

representing each bit value with a variable of the Boolean function;

constructing a minterm from the each element; and constructing the Boolean function by Oring the minterms; and generating a binary decision diagram corresponding to the Boolean function.

17. The non-transitory computer-readable media of claim 11, the software further operable to store an inverted index list of the plurality of inverted index lists by:

representing an inverted index list by a Boolean function by performing the following for each element of the inverted index list:

expressing the each element as a 2-to-the-power-k base value comprising a plurality of base-2-to-the-power-k digits; and encoding each base-2-to-the-power-k digit to yield an encoded base-2-to-the-power-k digit comprising a plurality of bit values;

representing each bit value with a variable of the Boolean function; and generating a binary decision diagram corresponding to the Boolean function.

18. The non-transitory computer-readable media of claim 11, the software further operable to store an inverted index list of the plurality of inverted index lists by:

representing the inverted index list by a Boolean function; and generating a binary decision diagram corresponding to the Boolean function by:

establishing a plurality of nodes of the binary decision diagram; and determining a node structure for each node.

19. The non-transitory computer-readable media of claim 11, the software further operable to search the first inverted index list and the second inverted index list by:

traversing a first binary decision diagram representing the first inverted index list; and traversing a second binary decision diagram representing the second inverted index list.

20. The non-transitory computer-readable media of claim 11, the software further operable to search the first inverted index list and the second inverted index list further comprising searching a first binary decision diagram and a second binary decision diagram, the first binary decision diagram representing the first inverted index list, the second binary decision diagram representing the second inverted index list, by repeating the following until the end of either the first inverted index list or the second inverted index list is reached:

establish a current element of a current inverted index list comprising either the first inverted index list or the second inverted index list;

retrieve a next greater element from the other inverted index list;

compare the next greater element and the current element; and record a common element if the next greater element matches the current element.

21. A system comprising:

means for accessing an inverted index stored in a tangible storage medium, the inverted index comprising a plurality of inverted index lists for a plurality of words of a language, an inverted index list corresponding to a word indicating one or more pages that include the word, each of the plurality of inverted index lists stored by representing the inverted index list by a Boolean function and generating a binary decision diagram corresponding to the Boolean function;

means for, for each word pair of the plurality of words, the word pair comprising a first word and a second word:

searching a first inverted index list and a second inverted index list, the first inverted index list corresponding to the first word, the second inverted index list corresponding to the second word;

calculating an affinity between the first word and the second word according to the first inverted index list and the second inverted index list, the affinity describing a quantitative relationship between the first word and the second word; and recording the affinity in an affinity matrix; and means for reporting the affinity matrix.

\* \* \* \* \*